United States Patent Office 3,054,584
Patented Sept. 18, 1962

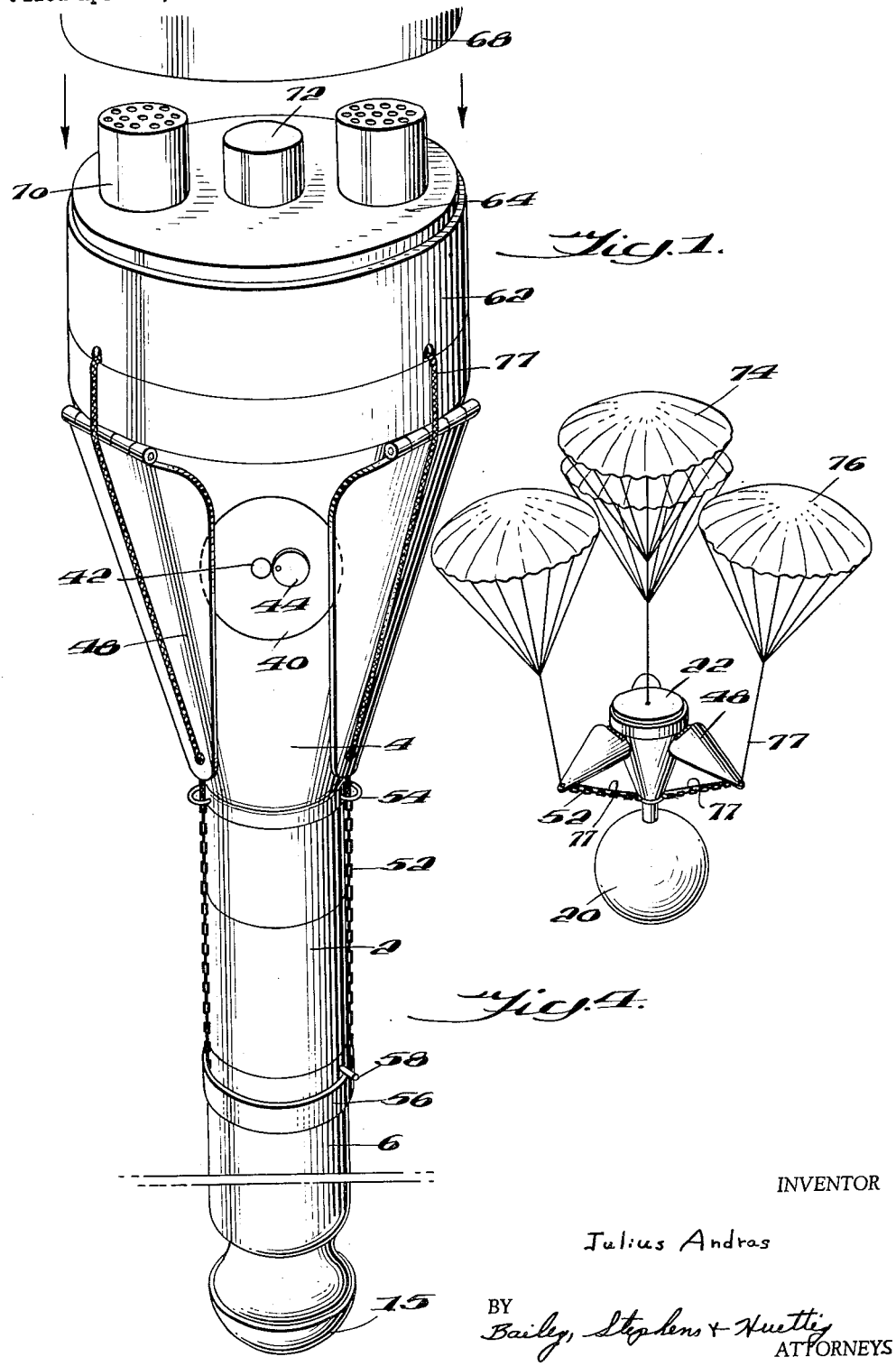

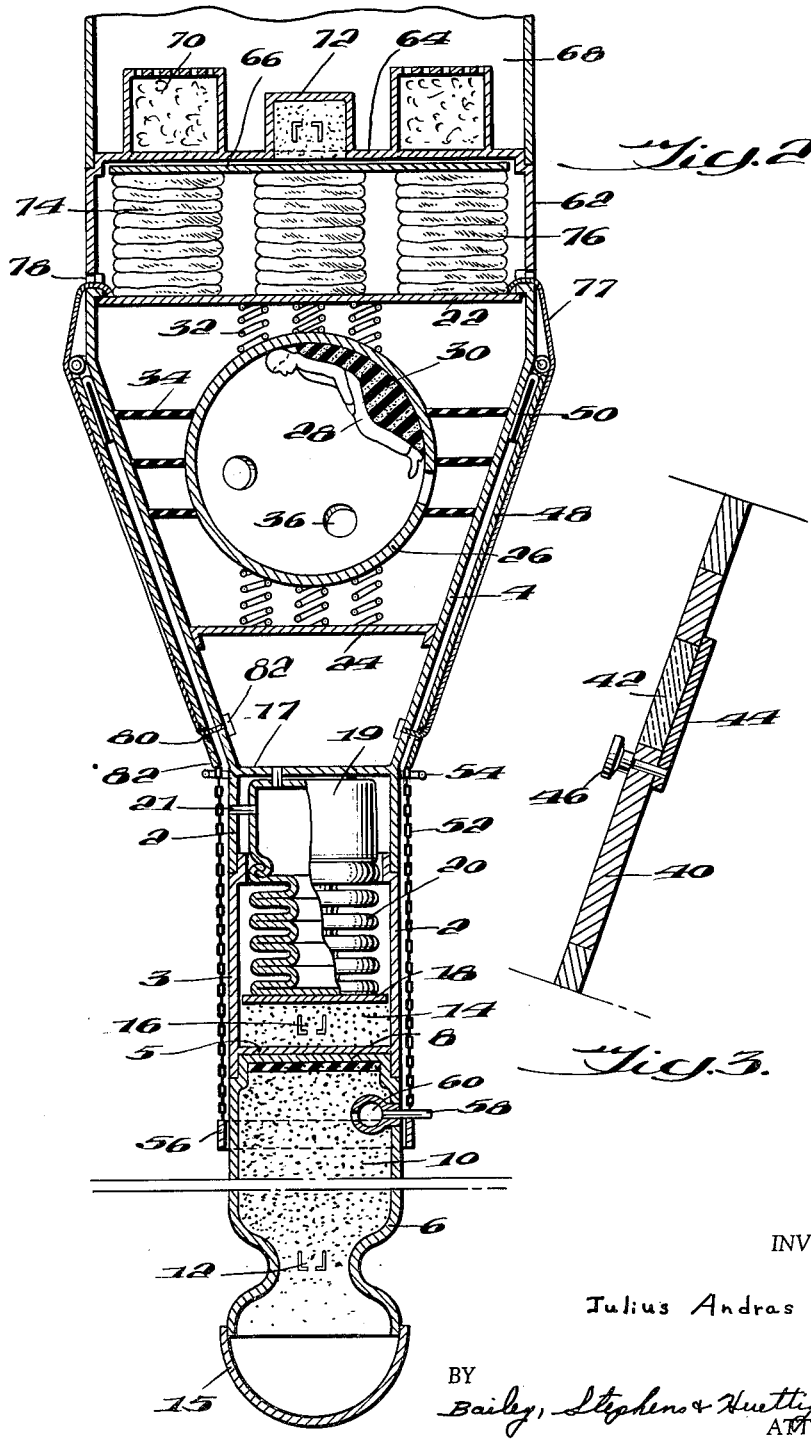

3,054,584
ROCKET WITH PARACHUTES
Julius Andras, 1716 Eye St. NW., Washington, D.C.
Filed Apr. 9, 1959, Ser. No. 805,321
15 Claims. (Cl. 244—139)

The invention relates to rockets, and more particularly to rockets intended to be projected into and to return to the earth from space.

The primary object of the invention is to provide a rocket with mechanism for slowing it down when it enters the atmosphere.

Another object of the invention is to provide a rocket which can return from space with a person inside it.

A further object of the invention is to provide a novel arrangement by which several parachutes can be attached to such a rocket without interference with each other.

It is also an object of the invention to provide a float arrangement composed of a balloon of substantial size, both to support the rocket if it lands in the water and to make it easier to locate, both in the air as it is falling and in the water after it lands.

Further objects and advantages of the invention will appear more fully from the following description especially when taken in conjunction with the accompanying drawings, which form a part thereof.

In the drawings:

FIG. 1 shows in perspective a rocket embodying the invention;

FIG. 2 is a vertical cross-section therethrough;

FIG. 3 shows the observation window; and

FIG. 4 shows the rocket after release of the balloons and parachute.

The rocket includes a cylindrical body portion 2 with an outwardly flaring upper end 4, these two parts being fixedly secured together. Frictionally secured at the lower end of part 2 is a tube 3 closed at its lower end by a wall 5. Frictionally secured on the lower end of tube 3 is a container closed at its upper end by insulating wall 8 for a powder charge 10 or the like, which may be ignited by a spark gap 12. A cap 15 is frictionally secured on the lower end of part 8. In the bottom of tube 3 is a second powder charge 14 which can be ignited by spark gap 16. Above this powder charge is a movable wall 18, and in the space within the tube 3 above wall 18 is a very elastic balloon 20, which is held in compressed position and is filled with a gas, such as air, under pressure. The balloon is secured to a tank 19 connected to the bottom wall 17 of part 4 which can be filled with air under pressure through valved pipe 21 after the collapsed balloon has been assembled inside tube 3.

Inside part 4, between upper and lower walls 22, 24 is a sphere 26 for a passenger 28, who can rest on a sponge rubber seat 30. Sphere 26 is held centered in the part 4 by springs 32 and rubber bands 34, which will cushion the passenger, especially during take-off and landing. It has holes 36 through which the passenger can reach instruments, supplies and the like. The part 4 has a door 40 with a window 42 which can be covered by a disc 44 turnable by knob 46 from the inside of the rocket.

Hinged on the outside of part 4 are vanes 48 which are pushed towards extended position by leaf springs 50. Chains or cables 52 are connected to the outer ends of the vanes and pass through eyes 54 to a ring 56 slidable on the outside of body 2. This ring is normally held in the position shown in FIG. 1, in which the vanes lie flat against the outside of part 4, by a pin 58 passing through the wall of part 6 into a chamber 60 which contains an explosive and which communicates with the interior of container 6.

Frictionally secured on the upper edge of part 4 is a cap 62 having a top wall 64 and a movable wall 66 below the top wall. This cap fits frictionally into a prior stage rocket 68, such as a third stage rocket. Wall 64 has three or more containers secured to it. Containers 70 open upwardly, while container 72 opens downwardly, all being filled with explosive.

Within cap 62 are packed three or more parachutes. One parachute 74 is centrally located and its lines are connected to the center of wall 22. The other parachutes 76 are connected by lines 77 which pass through notches 78 in the upper edge of part 4 and lower edge of cup 72 and then through holes 80 in the ends of vanes 48 and are connected to the rocket at 82.

This device is operated as follows:

The rocket is shot into space by one or several earlier stages, and put in orbit. When it is to be brought back to the earth, charges 70 are exploded and detach the earlier stage 68. Now the charge 10 is fired, acting as a reverse rocket, slowing down the velocity and causing the rocket to drop towards the earth. Towards the end of the burning of the charge, and as the rocket approaches the atmosphere, the explosive in chamber 60 will drive out pin 58, allowing ring 56 to rise and vanes 48 to open under the action of springs 50.

Charge 14 is now set off and separates tube 3 and container 6 from the rocket. Balloon 20 is now free and will bulge out and expand under the effect of the compressed air which it contains.

At a suitable time, charge 72 is exploded and removes cap 62, allowing the parachutes to open. Parachutes 76 will be held away from the rocket, in positions where they will not interfere with parachute 74, in the manner shown in FIG. 4.

While I have described herein one embodiment of my invention, I wish it to be understood that I do not intend to limit myself thereby except within the scope of the claims hereto or herinafter appended.

I claim:

1. A rocket having a body, at least two hinged vanes on the side walls thereof, means to limit movement of the vanes away from the body so that said vanes can act as retarding means in the air, a plurality of parachutes, and means connecting the parachutes to the body including cables connected at one end to the body, and guiding means adjacent the outer ends of the vanes engaging said cables, the cables having parts extending beyond the guiding means and the parachutes being connected to the extending parts.

2. In a rocket as claimed in claim 1, a main parachute secured to said body centrally of the pivots of the vanes.

3. In a rocket as claimed in claim 2, means normally holding said parachutes in packed condition, and means to release said holding means.

4. In a rocket as claimed in claim 3, means normally holding said vanes against the body, and means to release said vane holding means.

5. In a rocket as claimed in claim 4, a balloon folded within the rocket body, means normally holding the balloon against expansion, means to release said balloon holding means, and a body of gas under pressure within the rocket in communication with the interior of the balloon.

6. In a rocket as claimed in claim 5, a pilot's chamber, and means resiliently mounting said chamber within the rocket.

7. In a rocket as claimed in claim 6, reverse force producing means in the end of the rocket remote from the parachutes.

8. In a rocket as claimed in claim 1, means normally holding said vanes against the body, and means to release said vane holding means.

9. In a rocket as claimed in claim 1, a balloon folded within the rocket body, means normally holding the balloon against expansion, means to release said balloon holding means, and a body of gas under pressure within the rocket in communication with the interior of the balloon.

10. In a rocket as claimed in claim 1, a pilot's chamber, and means resiliently mounting said chamber within the rocket.

11. In a rocket as claimed in claim 1, reverse force producing means in the end of the rocket remote from the parachutes.

12. A rocket having a body, at least two arms hinged on the outside thereof, means to limit movement of the arms away from the body, a main parachute secured to said body centrally of the pivots of the arms, a plurality of auxiliary parachutes, and means connecting the auxiliary parachutes to the body including cables connected at one end to the body, and guiding means adjacent the outer ends of the arms engaging said cables, the cables having parts extending beyond the guiding means and the auxiliary parachutes being connected to the extending parts.

13. In a rocket as claimed in claim 12, means normally holding said parachutes in packed condition, and means to release said holding means.

14. In a rocket as claimed in claim 1, means normally holding said parachutes in packed condition, and means to release said holding means.

15. In a rocket as claimed in claim 12, means normally holding the arms against the body, and means to release said arm holding means.

References Cited in the file of this patent

UNITED STATES PATENTS

| | | |
|---|---|---|
| 2,346,255 | Hansson | Apr. 11, 1944 |
| 2,729,409 | Hand | Jan. 3, 1956 |
| 2,887,055 | Bagdanovitch et al. | May 19, 1959 |

OTHER REFERENCES

Aviation Week Magazine, vol. 69, No. 1, July 7, 1958, pages 49, 51, and 52 relied upon.

Flight Magazine, vol. LXI, No. 2266, June 27, 1952, pages 774 and 775.

Aviation Week Magazine, vol. 70, No. 6, Feb. 9, 1959, page 63.